United States Patent Office 2,891,034
Patented June 16, 1959

2,891,034

COMPOSITION COMPRISING A REACTION PRODUCT OF A POLYESTER AND A POLYEPOXIDE AND PROCESS FOR PREPARATION

Willy Fisch, Binningen, Switzerland, assignor to Ciba Limited, Basel, Switzerland, a Swiss firm No Drawing. Application June 27, 1955
Serial No. 518,365

Claims priority, application Switzerland August 12, 1949

5 Claims. (Cl. 260—45.4)

It is known that compounds which contain at least two epoxide groups per mol can be converted into infusible artificial resins by means of cross-linking agents, such for example as polycarboxylic anhydrides, hardening taking place practically without the formation of volatile by-products and with only very slight shrinkage. Owing to their mechanical properties and chemical resistance such products are of considerable interest as cast products, lacquers or adhesives, especially for metals. As cross-linking agents there have been used only compounds in which the distance between the groups capable of reacting with epoxide groups is small.

However, in addition to their good properties for certain purposes the products so obtained have the disadvantage that they are not sufficiently extensible and elastic.

The present invention is based on the observation that valuable artificial masses can be made by mixing a compound containing more than one epoxide group per mol with a cross-linking agent, and if desired, a catalyst, provided that certain requirements are observed. These requirements are that the linking agent used must be a compound containing at least two groups capable of reacting with epoxide groups, and at least two of these reactive groups must be separated from one another by a chain of at least 10, preferably at least 14, and advantageously at least 24, members. The artificial masses so obtained can be converted by heat, if desired, with the aid of catalysts, into useful artificial products.

Thus, depending on the nature of the artificial mass and on the manner in which it is treated, there can be obtained as an intermediate stage fusible and inelastic artificial products, which can be converted by further treatment at a later stage into fusible and elastic products, and especially into fusible final products of surprising elasticity. Obviously, such final products can be obtained in one operation from the artificial masses. The degree of elasticity can be varied within wide limits. It depends on the quantity of the cross-linking agent used, on the number and nature of the members between the active groups in the cross-linking agent and also on the distance apart of the epoxide groups in the compound containing such groups. The elasticity can also be strongly influenced by using, in addition to a cross-linking agent in which a chain of at least 10 members separates the reactive groups, one in which those groups are separated by a chain having less than 10 members. In general, in this manner the modulus of elasticity is increased and the length to which this material can be drawn out before breaking reduced.

As groups, hereinafter also referred to as active groups, capable of reacting with epoxide groups, there may be used principally groups containing active hydrogen, for example, radicals of acid or alkaline action, such as carboxyl, or amino or amide or imino or imide groups. The acid groups may be present in the form of anhydrides or in another form which is easily convertible into the free acid. However, there may also be used aliphatic or aromatic hydroxyl-groups generally requiring more extreme reaction conditions such as a higher temperature or the use of catalysts.

The active groups of the cross-linking agent may be bound together by a very wide variety of different kinds of members, such as

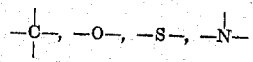

or aliphatic, aromatic or heterocyclic rings etc. Rigid rings such, for example, as benzene rings, are reckoned as one member.

As cross-linking agents which are compounds containing at least two groups capable of reacting with epoxide groups, at least two of these reactive groups being separated by a chain of at least 10 members, there are to be understood herein the following products which are known in the literature or can be made by the ordinary methods:

I. Unitary compounds.

II. Mixtures, for example, polyesters or polyamides, such as are obtained, for example, by reacting polyhydric alcohols, advantageously di-alcohols, or polyamines, advantageously diamines, with polycarboxylic acids, advantageously dicarboxylic acids, or their anhydrides, and III. Mixtures of cross-linking agents, of which the reactive groups are separated from one another by a chain of less than 10 members, for example, triethylene tetramine or phthalic anhydride, with compounds or mixtures as mentioned under I or II above.

Especially suitable as cross-linking agents are long chain polyesters containing active groups. These can be obtained in a very simple manner by heating dicarboxylic acids with dialcohols, the length of the chain and also the nature of the end groups depending on the molecular ratio of the starting materials.

In polyesters so obtained other active groups may be subsequently introduced, or active groups which are already present may be converted into other active groups. Thus, for example, in the case of a long chain polyester having end carboxyl groups, the latter may be converted into the corresponding amide groups.

Cross-linking agents may also be formed in the presence of compounds containing epoxide groups, whereby the new artificial products can be obtained in one operation.

The instant application is primarily concerned with compositions of matter comprising (1) an acidic low molecular weight polyester having an acid number above 200 and containing free carboxyl groups and comprising the product of reaction of a mixture of ingredients comprising a polyhydric alcohol and a dicarboxylic acid free of polymerizable ethylenic unsaturation and (2) a complex epoxide resin containing epoxy groups and comprising a polyether derivative of a polyhydric organic compound from the group consisting of polyhydric alcohols and phenols having at least two phenolic hydroxy groups.

As compounds containing more than one epoxide group per mol there are to be understood not only chemical unitary compounds but also mixtures of compounds containing epoxide groups such, for example, as are obtained in known manner by reacting mono-nuclear or poly-nuclear polyphenols advantageously diphenols, with epichlorhydrin or dichlorhydrin in the presence of an aqueous alkali, whereby, depending on the molecular ratio of the components used, mixtures of different polyethers having chains of different lengths and epoxide groups predominantly in end positions and, if desired, intermediately placed hydroxyl groups, for example, of the following constitution:

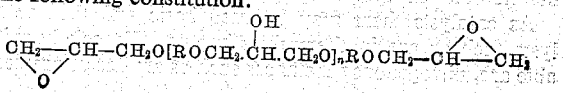

in which the atomic grouping ORO may represent, for example, the radical of a so-called diphenol, that is to say, for example, a compound of the type of 4:4'-dihydroxydiphenyl-dimethyl-methane, or resorcinol.

Aliphatic alcohols and epichlorhydrin can also be converted into chlorhydrin ethers with the aid of condensing agents such as boron trifluoride, which chlorhydrin ethers change into compounds containing epoxide groups by the elimination of hydrogen chloride by means of an agent of alkaline reaction. Furthermore, it is possible to obtain substances containing epoxide groups by treating compounds containing olefinic double bonds with oxidizing agents, for example perbenzoic acid or with hypochlorite.

It is of advantage to use starting materials containing epoxide groups in which there is a certain distance between at least two of the epoxide groups. The epoxide groups may be connected to one another in various ways. Generally speaking it can be said that when the active groups of the cross-linking agent are relatively far apart the distance between the epoxide groups may be smaller.

In order to produce artificial masses, which can be converted by heat and if desired with the aid of catalysts into hardened elastic artificial products, the compounds containing epoxide groups are mixed with the cross-linking agents and if desired, with catalysts. If the starting materials are liquid the mixture may be produced at room temperature, and if one or both of them are solid, the mixing is best conducted with the aid of heat in the form of a liquid melt. The use of high temperatures may also be of advantage when the starting materials are not easily compatible with one another. The mixture is then treated at a raised temperature until a clear melt is obtained.

Mixing may also be carried out in the presence of solvents, and in this manner, depending on the choice of the solvents, lacquers can be obtained ready for use, which yield elastic coatings.

However, it is also possible to obtain artificial masses which withstand storage and are liquid or at least thickly liquid at room temperature, and which can be used without any solvent at ordinary temperature, for example, for coating or casting, and which after application can be converted, for example, by heat treatment into the hardened and elastic state.

In this case the aforesaid products constitute solvent-free lacquers and may also be used for adhesively uniting a very wide variety of materials, especially metals, as such or on other substrata.

The new products represent a considerable advance, for example, in the art of making cast products. Hitherto it has indeed been possible to produce large hardened bubble-free cast products with the aid of compounds containing epoxide groups. However, it has always been difficult to enclose large articles such as metal parts by casting resins, such as is frequently required, for example, in the case of electrical apparatus, because strains subsequently occur due to the difference between the coefficients of thermal expansion of resin and metal. These difficulties are overcome by means of the new elastic products even in the hardened condition, since an enclosure covering a large metal core and composed of the new artificial product exhibits no fissures even after a long time.

The relative proportions by weight of the cross-linking agent and the compound containing epoxide groups may vary within very wide limits. Advantageously the cross-linking of the compound containing epoxide groups is brought about with a proportion of the cross-linking agent such as contains in the active groups a number of active hydrogen atoms approximately corresponding to the number of epoxide groups present.

As catalysts there may be used basic and acid catalysts such as are in themselves known. Especially suitable are, nitrogenous substances such as amides or amines, for example, triethylene tetramine and also, for example, sodium hydroxide or sulfuric acid. There may also be used substances of the type of Friedel-Crafts catalysts, for example, boron trifluoride. There are also cross-linking agents which act simultaneously as catalysts such, for example, as triethylene tetramine mentioned above and polyesters containing tertiary nitrogen atoms, for example, a polyester obtained from adipic acid and ethyl-diethanolamine, or from sebacic acid and triethanolamine.

The hardenable artificial masses or their components may be mixed at any stage prior to hardening with filling materials, softening agents, coloring substances, etc. The invention also includes the possibility that a part of the cross-linking agent, especially when it is used in large quantities, does not react completely and therefore acts as a softening agent.

The terms "hardenable" and "harden" are used herein not in a mechanical sense but with reference to the chemical properties or reactions. Those terms denote the capacity for conversion and the actual conversion, respectively, from a soluble and fusible condition into an insoluble and infusible condition. Accordingly, chemical hardening may lead to products which are mechanically very soft.

The following examples illustrate the invention, the parts being by weight:

EXAMPLE 1

730 parts of adipic acid (5 mols) and 248 parts of glycol (4 mols) are heated up to 220° C. The water formed during the reaction is distilled, and the last traces thereof are removed with the aid of reduced pressure. There is obtained a mass which is salve-like in the cold, and contains 2.5 free acid equivalents per kilogram, which corresponds to an acid number of 140, as determined by titration. This corresponds to a mixture of compounds in the nature of long chain polyesters having two end carboxyl groups, that is to say corresponding to dicarboxylic acids having an average molecular weight of about 800 and an average of about 44 members in the chain.

In order to prepare a product containing epoxide groups 228 parts of dihydroxy-diphenyl-dimethyl methane (1 mol) are reacted with 148 parts of epichlorhydrin (1.6 mol) and an aqueous solution of caustic soda, and the product is washed and dried. A brittle resin is obtained which contains about 2.4 epoxide equivalents per kilogram and is hereinafter referred to as product A.

Equal parts of the two products obtained as described above are melted together, for example, at 100° C., to produce a mixture which is thinly fluid at 100° C. and withstands storage and is thickly liquid in the cold. The mixture is heated in an open vessel for 16 hours at 165° C. to produce a transparent soft rubber-like artificial product of high elasticity. The new product exhibits no thermoplastic character, and does not fuse even at very high temperatures. By heating the mixture for 48 hours instead of 16 hours, practically the same product is obtained.

The hardening of the cast products can be increased by the addition of phthalic anhydride. Thus, by using 1 part each of product A and the dicarboxylic acid and 0.12 part of phthalic anhydride, there is likewise obtained a pourable mass which withstands storage and which is hardened, for example, by heating for 16 hours at 165° C. or by heating for ¾ hour at 220° C., to form a rubber-like product. Also with this mixture very large bubble-free cast bodies can be obtained, which may if desired have metal bodies embedded therein.

Even harder products are obtained by melting together, for example, 1 part of product A, 0.65 part of the cross-linking agent described above and 0.15 part of phthalic anhydride. Such a mixture hardens after 5 hours at 165° C. In the form of a plate having a thickness, for example, of 12 mm., the product is difficult to bend without breaking, but in the form of thin layers about 1 mm. thick it can be completely folded without breaking.

The hardness of the final product can be varied within wide limits, not only by the addition of phthalic anhydride, that is to say, by means of a cross-linking agent having a distance between the active groups of less than 10 members, but also with the aid of quantities of the cross-linking agents characteristic of the present invention. For example, by melting separate portions of 1 part of product A with 0.26, 0.67, 0.83, 1.00, 1.25 and 1.5 parts, respectively, of the long chain dicarboxylic acid, and hardening the mixture for 16 or 48 hours at 165° C. in a suitable vessel there are obtained cast products which extend over the whole range from hard to quite soft rubber-like products.

EXAMPLE 2

In the following table are given the results of hardening mixtures of product A with various polyester-like dicarboxylic acids obtained in a manner analogous to that described in the first paragraph of Example 1. The hardening periods do not represent minimum periods. In the last column the properties of the elastic moldings are given. The numbers of members in the chain represent average values which are calculated both on the basis of molecular ratios and ascertained by acidimetric titration, these two values having been found always to agree well.

It is necessary to explain that the experiment (f) which uses sebacic acid as the cross-linking agent is not included in the present invention, since in this case the number of members in the chain is only 8. The resulting products are correspondingly hard and not elastic:

ample 1 up to 210° C. The resulting polyester contains 3.4 mols of end hydroxyl groups per kilogram. It is therefore a dialcohol having about 32 members in the chain.

By melting 1 part of product A (prepared as described in Example 1) with 0.8 part of the aforesaid dialcohol at about 100° C., and treating the mixture for 16 hours at 165° C., practically no change occurs. The product is also still fluid at room temperature. However, by heating the mixture for 16 hours at 220° C. a bubble-free rubber-like cast product is obtained.

The reaction can be accelerated with the aid of phthalic anhydride as a cross-linking agent having in the chain less than 10 members, products with varying degrees of elasticity being obtained depending on the quantity of the phthalic anhydride, as explained below:

Separate portions of 1 part each of the above mixture are mixed with 0.14, 0.17, 0.21, 0.25 and 0.31 part of phthalic anhydride, and heated for 16 hours at 165° C. In all cases there are obtained cast products which at the beginning of the series are still soft but towards the end of the series are rather hard.

The phthalic anhydride may here react in two different ways. Firstly, it may react with the two end hydroxyl groups of the polyester, whereby a long chain dicarboxylic acid is formed, which as a multi-membered cross-linking agent enters into reaction with the epoxy-compound. However, it is also possible that it enters into reaction directly with the epoxide groups or with any hydroxyl groups present in the epoxy compound.

Cross-linking when hydroxyl groups are used as active groups can also be accelerated by means of catalysts. For example, by mixing 1 part of the molten polyester with 0.006 part of a solution of 32 percent strength of boron trifluoride in anisole, melting the mixture with 1

Table

| Cross linking agent (V), starting materials | Number of members in the chain | Acid-number | Hardenable mixture of 1 part of product A and— | | Hardening | Remarks |
|---|---|---|---|---|---|---|
| | | | Parts of V | Part of phthalic anhydride | | |
| (a) | | | 0.33 | | 16 hours at 165° C. | rather hard. |
| 3 mols of adipic acid, 2 mols of glycol | 24 | 228 | 0.66 | | do | Do. |
| | | | 1.00 | | do | rather soft. |
| | | | 1.33 | | do | very soft. |
| (b) | | | 0.66 | 0.1 | do | rather soft. |
| 2 mols of adipic acid, 1 mol of glycol | 14 | 352 | 0.2 | | do | rather hard. |
| | | | 0.4 | | do | Do. |
| | | | 0.6 | | do | rather soft. |
| | | | 0.8 | | do | Do. |
| | | | 1.0 | | do | very soft. |
| (c) | | | | | 40 hours at 165° C. | still liquid. |
| 10 mols of adipic acid, 9 mols of glycol | 100 | 65 | 1.3 | | 80 hours at 165° C. | very soft. |
| | | | 2.6 | | 16 hours at 165° C. | Do. |
| (d) | | | 1.0 | 0.25 | do | soft. |
| 4 mols of adipic acid, 3 mols of 2:3-butylene glycol. | 34 | 150 | 1.0 | | do | Do. |
| (e) | | | 1.0 | | do | Do. |
| 4 mols of adipic acid, 3 mols of ethyl-hexane-diol. | 46 | 123 | 1.0 | 0.08 | do | Do. |
| | | | 1.0 | 0.16 | do | rather soft. |
| | | | 1.0 | 0.24 | do | Do. |
| | | | 1.0 | 0.32 | do | rather hard. |
| (f) | | | 0.2 | | do | hard. |
| sebacic acid | 8 | 555 | 0.3 | | do | Do. |
| | | | 0.5 | | do | Do. |
| (g) | | | 0.6 | | do | soft. |
| 3 mols of sebacic acid, 2 mols of diglycol | 42 | 150 | 0.8 | | do | Do. |
| | | | 1.0 | | do | Do. |
| (h) | | | 1.33 | | do | very soft. |
| 3 mols of succinic acid, 2 mols of diglycol | 24 | 227 | 0.2 | | do | hard. |
| | | | 0.4 | | do | rather hard. |
| | | | 0.6 | | do | soft. |
| | | | 0.8 | | do | Do. |
| | | | 1.0 | | do | Do. |

EXAMPLE 3

438 parts of adipic acid (3 mols) and 248 parts of glycol (4 mols) are heated together as described in Example 1 up to 210° C. The resulting polyester contains part of product A, and hardening at 160° C., the mass gelatinizes even after ½ hour and there is obtained after a few hours a clear, soft, elastic molding. If there is used instead of boron trifluoride, 0.01 part of concentrated sulfuric acid gelatinization occurs at about 160° C. after 1½ hours. After 2–2½ hours there is likewise obtained a clear pale cast product, but with longer hardening periods the product begins to become colored.

By mixing 1 part of the above described polyester from adipic acid and glycol with 0.1 part of an ethyl alcoholic solution of 10 percent strength of sodium hydroxide and evaporating the alcohol at a high temperature, there is obtained a neutral mass which contains 1 percent of sodium hydroxide in the form of the sodium salt of hydrolyzed ester groups of the polyester. By melting the resulting mass with 1.4 parts of product A, and hardening at about 140 or 160° C., gelatinization occurs after 1¾ or ¾ of an hour, respectively. After a total hardening period of 2½ or 1½ hours, respectively, the reaction is complete, whereby very slightly turbid, very soft, rubber-like cast products are obtained.

EXAMPLE 4

Ammonia is passed through the molten polyester of Example 1, which contains 2.5 free acid equivalents per kilogram, at about 200° C. for 2 hours, and then the excess of ammonia is driven off. There is obtained a product which contains 2.5 equivalents of nitrogen per kilogram and consists essentially of the acid amide.

1 part of the product so obtained is melted together with 1 part of product A obtained as described in Example 1, and the mixture is hardened at 160° C. After 24 hours the mass is still liquid and after a total hardening period of 40 hours it is soft and rubber-like.

By using 1 part of the above-mentioned product and 2 parts of product A the mass begins to gelatinize at 160° C. even after 2 hours, and after 4 hours a rather harder elastic cast product is obtained. At 140° C. hardening requires 7 hours.

EXAMPLE 5

548 parts of adipic acid (4 mols) and 400 parts of ethyl-diethanolamine (3 mols) are esterified as described in Example 1. There is obtained a liquid polyester having an acid equivalent of 2.23 mols per kilogram, which agrees exactly with the calculated value. The polyester contains 3 basic tertiary nitrogen atoms in the chain and in all about 43 members.

Portions of 1 part each of product A (obtained as described in Example 1) are mixed with 0.4, 0.6, 0.8, 1.0 and 1.2 parts of the above mentioned polyester and hardened for 16 hours at 165° C. The first product is rather hard while the subsequent products are progressively softer.

The basic nitrogen atoms in the molecule of the above polyester cause this cross-linking agent to act simultaneously as a catalyst. Thus, if product A is treated at 165° C. on the one hand with 0.6 part of the above ester, and on the other with 0.6 part of the polyester described in Example 1, which contains practically the same number of members, in the first case gelatinization occurs after 1 hour while in the second case this requires 6–7 hours.

EXAMPLE 6

548 parts of adipic acid (4 mols) 150 parts of thiodiglycollic acid (1 mol) and 248 parts of glycol (4 mols) are esterified in the manner described in Example 1. There is obtained a polyester having an average molecular weight of 838 and on average one sulfur bridge is present per molecule.

Equal parts of the above ester and product A, prepared as described in Example 1, are melted together, cast and hardened for 16 hours at about 160° C. A very soft rubber-like cast product is obtained.

EXAMPLE 7

By using in the second paragraph of Example 1, instead of 1.6 mols of epichlorhydrin, only 1.4 mols thereof a resin melting at a higher temperature is obtained which contains only about 1.5 epoxide equivalents per kilogram and of which the epoxide groups are at a greater distance from one another than in product A of Example 1.

1 part each of the above product and of product A are melted with 1 part of a polyester obtained from 4 mols of adipic acid and 3 mols of ethylhexane-diol and hardened for 16 hours at 165° C. In both cases rubber-like cast products are obtained, the first mentioned mixture being considerably softer than the second melt.

EXAMPLE 8

In a manner analogous to that described in the second paragraph of Example 1 there is obtained from epichlorhydrin and dihydroxy-diphenyl-dimethyl-methane an epoxy-compound. By using a large excess of epichlorhydrin it is possible to obtain a still liquid product of relatively low molecular weight, which contains 4.8 epoxide equivalents per kilogram.

Separate portions of 11 parts each of the above product are melted with 15, 17.5, 20 and 21.5 parts of the polyester obtained as described in Example 1. There are obtained liquids which are stable and viscous in the cold and which harden in molds, for example, in 15 hours at 160° C., and give clear rubber-like cast products.

EXAMPLE 9

236 parts of succinic acid (2 mols) and 62 parts of glycol (1 mol) are esterified by the procedure described in Example 1. There is obtained a product which, when dissolved in acetone and titrated with caustic soda, is found to contain 7.6 acid equivalents per kilogram, which corresponds to an acid number of 427, and is a polyester having an average length of chain of 10 members.

1 part of the above ester is dissolved in 1 part of the liquid epoxy-compound of the preceding example, and hardened for 15 hours at 160° C. A clear hard elastic cast body is obtained.

EXAMPLE 10

15 parts of a liquid consisting essentially of compounds containing about two epoxide groups and having an epoxide equivalent weight of about 170 (prepared from epichlorhydrin and glycol as described on page 5 of British Patent No. 518,057) are mixed with 15 parts of the polyester of Example 1 above and 1.7 parts of maleic anhydride and hardened at 160° C. After 40 minutes the mass is gelatinized. After a total hardening period of 1 hour a clear bubble-free soft rubber-like cast product is obtained.

EXAMPLE 11

1 part of diglycide ether is mixed with 6 parts of the polyester of Example 1 and treated for 16 hours at 165° C. The product is still liquid. On the other hand, by using 1 part of diglycide ether with 3 parts of the polyester and 0.5 part of phthalic anhydride there is obtained under the same reaction conditions a solid jelly-like mass.

A similar mass is obtained by hardening 1 part of the glycide ether of glycerine with 3 parts of the polyester of Example 1 under the conditions given above.

The aforesaid glycide ether of glycerine is obtained by the condensation of glycerine with epichlorhydrin in the presence of boron trifluoride as catalyst, and subsequently splitting off hydrogen chloride by means of an alkaline agent. The product contains about 6.5 epoxide equivalents per kilogram.

EXAMPLE 12

A mixture of 1 part of product A and 0.6 part of the product described in the first paragraph of Example 1 is mixed with the quantities of triethylene tetramine as catalyst given below (the parts being calculated on the mixture) and hardened and the time required to harden the moldings ascertained:

| | Part | Hours | |
|---|---|---|---|
| (1) | 0 | 48 | 100° C. still completely liquid. |
| (2) | 0.004 | 12 | 100° C. hardened, soft and rubber-like. |
| (3) | 0.008 | 9 | Do. |

EXAMPLE 13

Dehydrated castor oil is converted as described in Industrial and Engineering Chemistry, vol. 38, page 1139 (1946) into the methyl ester of the corresponding acid, and the product is then polymerized under the conditions described in that publication and hydrolyzed. There is obtained a product having an acid number of 227. According to the information given in Industrial and Engineering Chemistry, vol. 33, page 89 (1941), this product consists of hydrocarbons containing as substituents two or three carboxyl groups respectively, which groups are separated from one another by 18 or 16 members, respectively.

4 parts of the above acid are melted together with 5 parts of product A prepared as described in Example 1. The mixture is at first turbid at temperatures below 150° C.

However, by treating the mixture for ½ hour at 165° C. a melt is obtained which remains clear even after cooling and solidifies to a viscous fusible mass.

This product is applied in the warm state to a metal plate and the coating is hardened for 6 hours at 165° C. A coating which adheres well and is very elastic even when thick is obtained.

EXAMPLE 14

606 parts of sebacic acid (3 mols) and 149 parts of triethanolamine (1 mol) are esterified in a manner analogous to that described in the first paragraph of Example 1. A product is obtained which contains 3.67 acid equivalents per kilogram, which corresponds to an acid number of 206 (the pure tris-sebacic acid monoester of triethanolamine containing 4.28 free acid groups per kilogram). It therefore consists at least in part of a compound containing three carboxyl groups which are separated from one another by 25 members.

Two portions of 1 part each of the above product are mixed with 1 part and 1.25 parts respectively of product A (prepared as described in Example 1) and there are obtained artificial masses, when hardened for about 10 minutes at 165° C. or for about 2 hours at 100° C., yield rubber-like masses. The short hardening periods show that in this case the cross-linking agent also functions as a catalyst owing to its basic nitrogen.

This application is a continuation-in-part of my application Serial No. 177,774, filed August 4, 1950, now U.S. Patent No. 2,712,535.

What I claim is:

1. A composition of matter comprising (1) an acidic low molecular weight polyester having an acid number above 200 and containing free carboxyl groups and comprising the product of reaction of a mixture of ingredients comprising a polyhydric alcohol and a dicarboxylic acid free of polymerizable ethylenic unsaturation and (2) a complex epoxide resin containing epoxy groups and comprising a polyether derivative of a polyhydric organic compound selected from the class consisting of polyhydric alcohols and phenols having at least two phenolic hydroxy groups.

2. A composition of matter comprising (1) an acidic low molecular weight polyester having an acid number above 200 and containing free carboxyl groups and comprising the product of reaction of a mixture of ingredients comprising ethylene glycol and adipic acid and (2) a complex epoxide resin containing epoxy groups and comprising a polyether derivative of a polyhydric organic compound selected from the class consisting of polyhydric alcohols and phenols having at least two phenolic hydroxy groups.

3. A composition of matter obtained by heating until an intercondensed product is obtained a mixture of ingredients comprising (1) an acidic low molecular weight polyester having an acid number above 200 and containing free carboxyl groups and comprising the product of reaction of a mixture of ingredients comprising a polyhydric alcohol and a dicarboxylic acid free of polymerizable ethylenic unsaturation and (2) a complex epoxide resin containing epoxy groups and comprising a polyether derivative of a polyhydric organic compound selected from the class consisting of polyhydric alcohols and phenols containing at least two phenolic hydroxy groups.

4. A composition of matter comprising the intercondensed product obtained by heating until intercondensation has taken place, a mixture of ingredients comprising (1) an acidic low molecular weight polyester having an acid number above 200 and containing free carboxyl groups and comprising the product of reaction of a mixture of ingredients comprising ethylene glycol and adipic acid and (2) a complex epoxide resin containing epoxy groups and comprising a polyether derivative of a polyhydric organic compound selected from the class consisting of polyhydric alcohols and phenols containing at least two phenolic hydroxy groups.

5. The process which comprises (a) forming a mixture of ingredients comprising (1) an acidic low molecular weight polyester having an acid number above 200 and containing free carboxyl groups and comprising the product of reaction of a mixture of ingredients comprising a polyhydric alcohol and a dicarboxylic acid free of polymerizable ethylenic unsaturation and (2) a complex epoxide resin containing epoxy groups and comprising a polyether derivative of a polyhydric organic compound selected from the class consisting of polyhydric alcohols and phenols containing at least two hydroxy groups, and (b) heating the aforesaid mixture for a time and at a temperature sufficient to effect intercondensation between the ingredients.

References Cited in the file of this patent

UNITED STATES PATENTS

| 2,683,181 | Cass | July 6, 1954 |
| 2,712,535 | Fisch | July 5, 1955 |

UNITED STATES PATENT OFFICE

CERTIFICATE OF CORRECTION

Patent No. 2,891,034                                            June 16, 1959

Willy Fisch

It is hereby certified that error appears in the printed specification of the above numbered patent requiring correction and that the said Letters Patent should read as corrected below.

Column 1, line 48, for "fusible" read -- infusible --.

Signed and sealed this 22nd day of December 1959.

(SEAL)
Attest:

KARL H. AXLINE                                          ROBERT C. WATSON
Attesting Officer                                     Commissioner of Patents